L. CHEETHAM.

Improvement in Devices for Communicating Motion to Machines.

No. 129,316. Patented July 16, 1872.

Witnesses.
C. F. Brown
H. Carlin Clark

Inventor.
Linneus Cheetham

By his Attys.
Dyer, Beadle & Co.

UNITED STATES PATENT OFFICE.

LINNEUS CHEETHAM, OF LEWISTON, MAINE.

IMPROVEMENT IN DEVICES FOR COMMUNICATING MOTION TO MACHINES.

Specification forming part of Letters Patent No. 129,316, dated July 16, 1872.

SPECIFICATION.

*To all whom it may concern:*

Be it known that I, LINNEUS CHEETHAM, of Lewiston, in the county of Androscoggin and State of Maine, have invented a new and useful Method of Arranging the Devices for Communicating Motion to Machines of various kinds; and I do hereby declare that the following is a full and exact description of the same, reference being had to the accompanying drawing and to the letters of reference marked thereon.

This invention consists, First, in the arrangement of the pulleys for communicating motion upon the adjacent ends of the shafts of two contiguous machines in such manner that the pulleys form a coupling to unite the two shafts together. Second, in the construction and arrangement of pulleys upon the shafts of two contiguous machines in such manner that both machines may be driven by a single set of pulleys, or either machine, at will, as will be fully described hereinafter.

Figure 1:
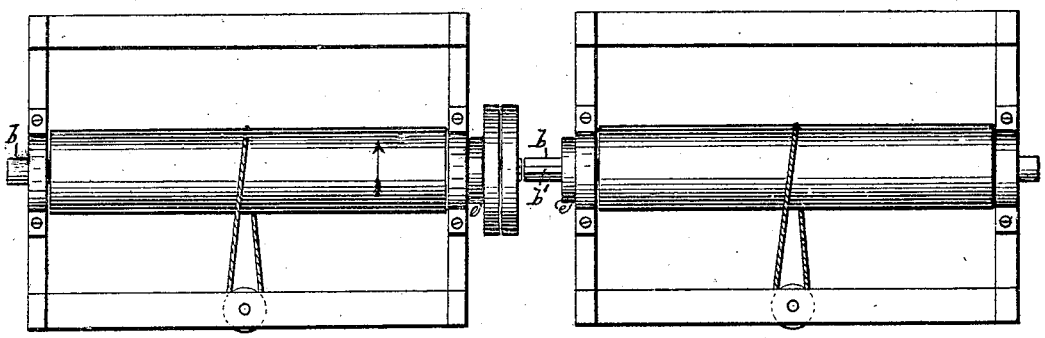
Figure 2:
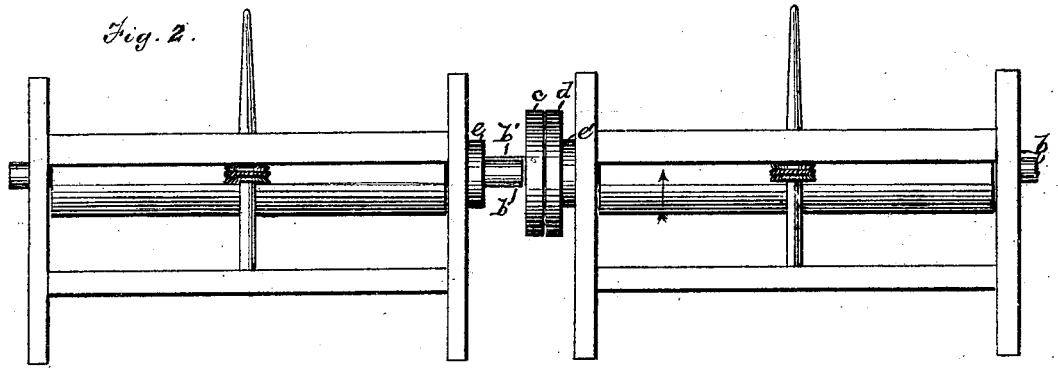
Figure 3:
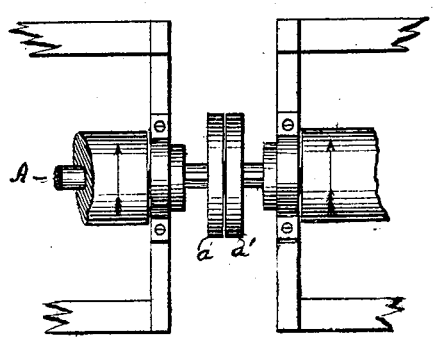
Figure 4:
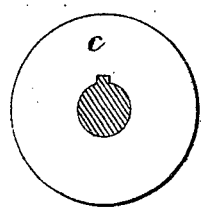

In the drawing, Figure 1 represents a plan view of two contiguous machines, the shafts of which are provided at their adjacent ends with pulleys adapted to extricate either shaft separately or both together. Fig. 2 represents an elevation of the same. Fig. 3 represents a plan view of pulleys adapted to actuate a continuous shaft in the center; and Fig. 4, a side elevation of one of the pulleys with the shaft in cross-section.

To enable others skilled in the art to make and use my invention, I will now proceed to decribe fully its construction and manner of operation.

A, Fig. 3, represents a long shaft, having the driving-pulleys $a$ $a'$ located in the center, as shown. These pulleys may be of any proper construction, and be provided with suitable belt-shifting devices, if desired. It is not essential that the pulleys should be located in the center of the shaft; but still at this point the best effect is produced, as the strain upon each side is equal.

In Figs. 1 and 2 is shown an arrangement for driving two contiguous machines with a single set of pulleys. $b$ $b$ represent the shafts set with their ends close together, and each provided with a key, $b'$, as shown. $c$ represents an ordinary pulley, which, by means of a groove corresponding with the key upon the shaft, is compelled to revolve with the latter, while it is free to slide longitudinally thereon. It is provided with a hub, upon which runs the loose pulley $d$. $e$ $e'$ represent collars upon the shafts $b$ $b$, by means of which the lateral position of the pulleys is determined.

The operation is as follows: When the pulleys are centrally located, so that the key of each shaft rests in the groove of pulley $c$, motion is communicated to both machines; but if the pulley is adjusted laterally, so that it rests only upon the shaft of one machine, motion will be communicated to that machine alone.

The described invention is especially adapted for machines for spinning yarn or roving for yarn; but it may be employed for other machines, if desired.

By means of this invention longer shafts may be employed on machines than would be possible otherwise, by means of which result much valuable room may at times be saved. If desired, two contiguous shafts may be coupled by a coupling consisting of a fast-and-loose pulley, so as to form one single continuous shaft.

Having thus fully described my invention, what I claim as new, and desire to secure by Letters Patent, is—

1. The arrangement of the pulleys for communicating motion upon the adjacent ends of the shafts of two contiguous machines in such manner as to form a coupling to unite the two shafts.

2. The pulleys $c$ $d$, adapted to communicate motion to either shaft $b$ $b$ separately, or to both shafts together, as described.

This specification signed and witnessed this 20th day of May, 1872.

LINNEUS CHEETHAM.

Witnesses:
C. F. BRIGHAM,
ALEXANDER McLEAN.